United States Patent [19]
van Dijk et al.

[11] Patent Number: 4,568,531
[45] Date of Patent: Feb. 4, 1986

[54] AMMONIA PURGE GAS CONVERSION

[75] Inventors: Christiaan P. van Dijk, Houston; Aage Solbakken, Montgomery; Bernard G. Mandelik, Houston, all of Tex.

[73] Assignee: The M. W. Kellogg Company, Houston, Tex.

[21] Appl. No.: 661,480

[22] Filed: Oct. 16, 1984

[51] Int. Cl.[4] .............................................. C01C 1/04
[52] U.S. Cl. ..................................... 423/361; 423/359
[58] Field of Search ................ 423/359, 360, 361, 362

[56] References Cited

U.S. PATENT DOCUMENTS

| 1,931,678 | 10/1933 | Porter | 23/199 |
| 2,046,478 | 7/1936 | O'Leary | 23/199 |
| 3,002,816 | 10/1961 | Friend et al. | 423/361 |
| 3,851,046 | 11/1974 | Wright et al. | 423/359 |
| 4,058,589 | 11/1977 | Haslam | 423/359 |
| 4,271,136 | 6/1981 | Tennison | 423/363 |
| 4,312,851 | 1/1982 | Isalski et al. | 423/359 |
| 4,383,982 | 5/1983 | Pinto | 423/359 |
| 4,409,196 | 10/1983 | Skinner et al. | 423/359 |
| 4,479,925 | 10/1984 | Shires et al. | 423/359 |
| 4,524,056 | 6/1985 | Banquy | 423/359 |

FOREIGN PATENT DOCUMENTS

| 82691 | 7/1978 | Japan | 423/359 |
| 1136040 | 12/1968 | United Kingdom | 423/359 |
| 1274504 | 5/1972 | United Kingdom | 423/359 |
| 2039858 | 8/1980 | United Kingdom | 423/359 |
| 2109361 | 6/1983 | United Kingdom . | |

Primary Examiner—John Doll
Assistant Examiner—Wayne A. Langel

[57] ABSTRACT

Purge gas removed from a first synthesis loop for conversion of synthesis gas to ammonia over an iron based synthesis catalyst is converted to ammonia over a more active synthesis catalyst in a second synthesis loop.

5 Claims, 1 Drawing Figure

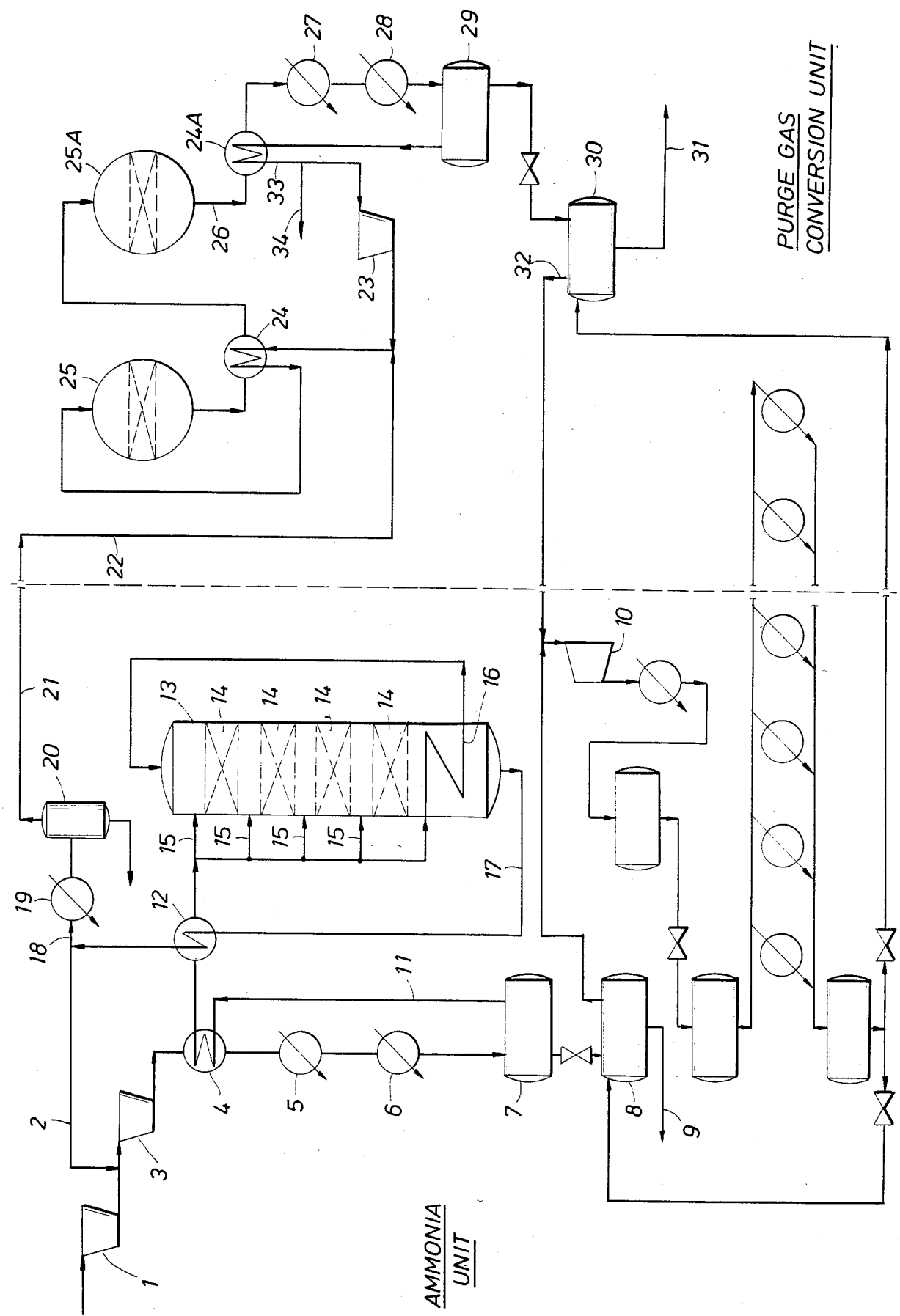

AMMONIA PURGE GAS CONVERSION

This invention relates to an ammonia plant purge gas conversion system.

For many years, commerical production of ammonia has been carried out in large, single-train plants which employ the sequential process steps of primary endothermic steam reforming, secondary exothermic steam reforming with air, shift conversion of carbon monoxide to hydrogen and carbon dioxide, carbon dioxide removal, and residual carbon oxide conversion to produce fresh ammonia synthesis gas in close to the stoichiometric hydrogen to nitrogen molar ratio (hereinafter sometimes referred to as H/N ratio) of three moles hydrogen and one mole nitrogen plus much smaller amounts of inert gases, predominantly methane and argon. In these single-train plants, the fresh synthesis gas is centrifugally compressed to a synthesis pressure generally between 105 and 280 kg/cm$^2$ and combined in a synthesis loop with centrifugally recompressed recycle gas from an ammonia conversion system. The conversion system is usually a single, high pressure, high temperature reactor having several beds of predominantly iron catalyst and is equipped with direct or indirect heat exchange means for removing exothermic heat of synthesis. Only partial conversion of the combined synthesis gas takes place in a single pass through the conversion system in which the ammonia content of the combined synthesis gas typically increases from between 1 and 4 volume percent at the converter inlet to between 10 and 18 volume percent at the converter outlet.

A purge gas stream is removed from the synthesis loop following ammonia recovery but preceding introduction of fresh synthesis gas to prevent excessive accumulation of inert gases which adversely affect reaction equilibrium. From any viewpoint, the hydrogen content of purge gas represents a loss. In most instances, the purge gas is burned as fuel in the primary reforming step to avoid complete waste of the hydrogen therein. A compromise must, therefore, be reached between excessive loss of hydrogen from the synthesis loop at one extreme and excessive accumulation of inert gases in the loop at the other extreme. Typically, the amount of purge gas is sufficient to maintain the argon plus methane concentration in the synthesis loop between 10 and 20 volume percent and may constitute from 1 to 3 volume percent of the converted gas from the conversion system depending upon inerts content of the fresh gas.

In order to employ hydrogen content of purge gas in the higher use of ammonia production, purge gas conversion is often considered with the objective of increasing ammonia production or reducing fuel and feed requirements in the primary reforming furnace or some combination of the two. Regrettably, purge gas conversion is often found to be uneconomic for the reason that the inert gas concentration is an obstacle to further conversion at the same pressure and temperature conditions because of equilibrium constraint.

Use of higher pressure in the second loop, i.e.—a purge gas conversion system, has been proposed to improve equilibrium conditions but this imposes the penalty of additional compressor energy consumption and is usually not economic.

Use of a very active synthesis catalyst in the second loop has been proposed in British Patent Application No. 2 109 361 A, published June 2, 1983. The process described therein employs a pressure in the second loop that is not greater than the pressure of the first loop and, therefore, only a small amount of power is necessary for recirculation of recycle gas in the second loop. Apparently, however, this process employs an extraordinarily high concentration of inert gases in the second synthesis loop and conversion to ammonia is thereby limited.

According to the invention, ammonia is produced in a first synthesis loop by partial conversion of a first combined synthesis gas having an H/N ratio between 2.50 and 2.90 over ammonia synthesis catalyst containing predominantly iron wherein the first combined gas is formed by combination of fresh ammonia synthesis gas having an H/N ratio between 2.80 and 2.98 with a first recycle gas also having a stoichiometric excess of nitrogen. A first purge stream is removed from the first synthesis loop and combined in a second synthesis loop with a second recycle gas to form a second combined synthesis gas having a greater stoichiometric excess of nitrogen than the fresh ammonia synthesis gas. The second combined synthesis gas is partially converted over a more active ammonia catalyst comprising a platinum group metal supported on graphite-containing carbon.

The drawing is a schematic flow diagram of a conventional ammonia synthesis plant modified with a purge gas conversion system in accordance with the invention.

The catalyst employed in the second loop of the process of the invention is highly active and ammonia can, therefore, be satisfactorily synthesis to high outlet concentration of ammonia at H/N ratios below the stoichiometric ratio of 3 at a pressure not greater than the pressure employed in the first synthesis loop. At the same time, we have found that it is not necessary to incur the equilibrium penalties associated with high concentrations of inert gases in either the first or the second loop. To advantage, the process of the invention employs a higher purge rate from the main synthesis loop than customarily used in a pre-existing plant with resulting decrease in inerts level and decrease in recycle gas compression requirements, and increase in outlet ammonia concentrations. In the context of energy savings at constant ammonia production, ammonia product from the first loop is reduced by the amount of product now made in the second loop and part of the existing refrigeration capacity is shifted to the second loop. Since, however, most of the hydrogen in the main purge stream is now devoted to ammonia production, a corresponding reduction in hydrogen make from the primary reforming furnace may be effected with attendant savings in the feed and fuel requirements.

In an embodiment of the invention, the fresh ammonia synthesis gas entering the first synthesis loop has an H/N ratio between 2.80 and 2.98 and a first purge stream is removed from the first synthesis loop in sufficient amount to maintain in the first synthesis loop a concentration of argon plus methane between 3 and 7 volume percent and an H/N ratio of combined gas in the loop between 2.50 and 2.90. The H/N ratio of the first combined gas will always be higher at the conversion system inlet than at the outlet but can be maintained within the recited range by adjustment of the now higher first purge stream flow and corresponding reduction in flow rate of the first recycle gas returning from the synthesis converter to the recycle gas compressor. The first combined gas is partially reacted over conventional ammonia synthesis catalyst containing predominantly iron, however, since flow rate to the converter is now reduced from that previously employed, the space velocity and pressure drop across the catalyst correspondingly decrease.

The first purge stream is then introduced to the second synthesis loop at a pressure not greater than that of the first loop and is there combined with a second recycle gas to form a second combined gas having an H/N ratio between 2.00 and 2.50 in the second synthesis loop. As in the first loop, the H/N ratio in the second synthesis loop is controlled by withdrawal of a second purge stream and flow rate control of the second recycle gas stream. The second combined gas is partially reacted over a substantially more active ammonia synthesis catalyst comprising a platinum group metal supported on graphite-containing carbon to yield a second converted gas having an ammonia concentration higher than that of the first converted gas and which may be between 10 and 22 volume percent. Ammonia product is recovered from the first and second loops preferably by a combination of indirect cooling with water supplemented by available mechanical refrigeration.

In a preferred embodiment of the invention, the second combined gas is reacted over the highly active synthesis catalyst recited at a pressure between 100 and 210 kg/cm$^2$ and a temperature between 315° C. and 435° C. Most preferably, the highly active synthesis catalyst is ruthenium supported on graphite-containing carbon more fully described in U.S. Pat. No. 4,250,057. In this preferred embodiment, the first purge stream will be from 2 to 7 volume percent of the first converted gas. When the foregoing conditions are employed in a purge gas conversion system installed on a conventional ammonia plant in which the pressure of the main or first synthesis loop is between 120 and 210 kg/cm$^2$ and the plant employs mechanical refrigeration, we prefer to operate the second synthesis loop in a manner providing an ammonia concentration in the second converted gas between 10 and 20 volume percent.

Referring now to the drawing, the left portion of the drawing schematically illustrates the synthesis section of a representative, nominal 1000 metric tons per day ammonia plant. The description immediately following pertains to operation of that synthesis section prior to addition of the purge gas conversion unit in accordance with the invention.

Fresh synthesis gas containing hydrogen and nitrogen in a 3:1 molar ratio and an argon plus methane concentration of 1.3 volume percent is introduced to make-up gas compressor 1 where it is compressed to 140 kg/cm$^2$ and then combined with recycle gas from line 2 containing 12 volume percent ammonia in addition to unreacted hydrogen and nitrogen and inert gases mentioned. The resulting combined synthesis gas is further compressed to 148 kg/cm$^2$ in recycle compressor 3 and cooled to −23° C. in exchanger 4 and ammonia chillers 5 and 6. Liquid ammonia is separated from the combined gas in separator 7. Inert gases are released from the liquid ammonia in a medium pressure separator (not shown) and combined with purge gas later described. Liquid ammonia is further expanded into the low pressure separator 8 to atmospheric pressure and a temperature of −28° C. Product ammonia is recovered via line 9 and ammonia vapor from separator 8 is compressed in refrigeration compressor 10 which is part of the refrigeration system shown in the lower part of the drawing. The refrigeration system is conventional and not further described here except to state that it provides low temperature chilling service for various parts of the process.

Combined gas now lean in ammonia leaves separator 7 via line 11 and is reheated in exchanger 4 and feed-effluent exchanger 12 for introduction to ammonia converter 13. The ammonia converter is of the quench type wherein heat of reaction in the iron catalyst beds 14 is controlled by introduction of cool quench gas 15 between the beds. The main portion of the combined gas is heated to synthesis temperature in feed-effluent exchanger 16 mounted within the converter. Converted gas in line 17 is cooled to 43° C. in feed-effluent exchanger 12 and the stream is then divided to form recycle stream 2 and purge stream 18. The purge stream is 1.7 volume percent of the converted gas and is taken to control the level of argon plus methane in the synthesis loop at 15 volume percent. Since the purge stream contains ammonia, the stream is cooled in ammonia chiller 19 and additional product ammonia is recovered from separator 20. The uncondensed purge gas containing hydrogen, nitrogen, and inert gases is removed from separator 20 via line 21 and utilized as fuel gas in production of the fresh synthesis gas.

When, in accordance with the invention, the ammonia plant is modified for energy savings with a purge gas conversion unit shown on the right portion of the drawing, the H/N ratio of the fresh synthesis gas to make-up gas compressor 1 is reduced from 3.0 to 2.9 and the size of purge stream is increased both absolutely and relative to the flow of recycle gas. Accordingly, recycle gas flow in line 2 decreases from about 24,948 to about 16,783 kg-moles per hour. This decrease in flow results in a product loss in the first synthesis loop of about 363 kg-moles per hour but substantially reduces the power requirement for recycle gas compressor 3.

Purge stream 21 is now taken to maintain a concentration of argon plus methane in the first synthesis loop of 5.6 volume percent and constitutes 6.3 volume percent of the first converted gas. The purge stream is now directed via line 22 to the second synthesis loop where it is combined with second recycle gas from the purge recycle compressor 23. The resulting second combined gas is at a pressure of 140 kg/cm$^2$ and has an H/N ratio of 2.4 which is suitable for the catalyst in the purge gas conversion system of the second loop. The second combined gas is heated to 350° C. in feed-effluent exchanger 24 and introduced to purge gas converter 25. Only a single stage purge gas converter is required for a 1000 metric ton per day plant, however, two converters 25, 25A may be employed in larger ammonia plants. The purge gas converter is a hot wall, spherical reactor with top inlet, bottom outlet, and a gas diffuser for uniform distribution of the second combined gas over a thin bed of ruthenium catalyst supported on graphite-containing carbon. High activity of this catalyst permits supplemental conversion of the purge gas to replace product displaced from the first synthesis loop with an increase in overall ammonia yield from hydrogen.

The second converted gas in line 26 is cooled in feed-effluent exchanger 24, 24A and further cooled by respectively cold water and chilled ammonia in exchangers 27 and 28. The high ammonia concentration in the second converted gas permits ammonia recovery by cold water exchange supplemented by ammonia refrigeration available from the first synthesis loop now operating with reduced refrigeration requirements. Product ammonia is recovered in separators 29 and 30 which compare in function to separators 7 and 8 in the first synthesis loop and ammonia is removed via line 31. 363 kg-moles per hour of ammonia is recovered from separator 30 which replaces loss of product in the first synthesis loop. Vapor from separator 30 is returned to refrigeration compressor 10 via line 32. Vapor from separator 29 becomes the second recycle gas and is passed to purge recycle compressor 23 via line 33. A second purge stream 34 is taken from the second recycle gas to maintain the hydrogen to nitrogen molar ratio at 2.4 and the concentration of argon plus methane at 11 volume percent in the second synthesis loop.

We claim:

1. In a process for producing ammonia in a first synthesis loop wherein fresh ammonia synthesis gas containing hydrogen, nitrogen, and lesser amounts of argon and methane is combined with a first recycle gas to provide a first combined synthesis gas, a portion of the first combined synthesis gas is reacted over ammonia synthesis catalyst containing iron to provide a first converted gas, a first purge stream is removed from the first converted gas to provide the first recycle gas, and ammonia is recovered from the first synthesis loop, the improvement which comprises:

(a) adjusting the hydrogen to nitrogen molar ratio of the fresh ammonia synthesis gas to between 2.80 and 2.98 and removing the first purge stream in sufficient amount to maintain a concentration of argon plus methane in the first synthesis loop between 3 and 7 volume percent and the hydrogen to nitrogen molar ratio in the first synthesis loop between 2.50 and 2.90;

(b) introducing the first purge stream to a second synthesis loop wherein the first purge stream is combined with a second recycle gas to provide a second combined synthesis gas, reacting a portion of the second combined synthesis gas over ammonia synthesis catalyst comprising a platinum group metal supported on graphite-containing carbon to provide a second converted gas;

(c) recovering ammonia from the second synthesis loop; and (d) removing a second purge stream from the second synthesis loop in sufficient amount to maintain the hydrogen to nitrogen molar ratio in the second synthesis loop between 2.00 and 2.50.

2. The process of claim 1 wherein the second combined synthesis gas is reacted over the ammonia synthesis catalyst comprising a platinum group metal supported on graphite-containing carbon within the temperature range between 315° C. and 435° C. and at a pressure between 100 kg/cm$^2$ and 210 kg/cm$^2$.

3. The process of either claim 1 or claim 2 wherein the first purge stream is between 2 and 7 volume percent of the first converted gas.

4. The process of claim 2 wherein the second converted gas has an ammonia concentration between 10 and 20 volume percent.

5. The process of either claim 1 or claim 2 wherein the platinum group metal is ruthenium.

* * * * *